US011365812B2

(12) United States Patent
Lee et al.

(10) Patent No.: US 11,365,812 B2
(45) Date of Patent: Jun. 21, 2022

(54) AIR CONTROL VALVE FOR FUEL CELL VEHICLE

(71) Applicants: HYUNDAI MOTOR COMPANY, Seoul (KR); KIA MOTORS CORPORATION, Seoul (KR)

(72) Inventors: Byeong Seung Lee, Seoul (KR); Sang Woo Kim, Chuncheon-si (KR); Jeong Hee Park, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/001,900

(22) Filed: Aug. 25, 2020

(65) Prior Publication Data

US 2021/0301926 A1 Sep. 30, 2021

(30) Foreign Application Priority Data

Mar. 24, 2020 (KR) .......................... 10-2020-0035721

(51) Int. Cl.
*F16K 1/20* (2006.01)
*F16K 31/04* (2006.01)

(52) U.S. Cl.
CPC .......... *F16K 1/2021* (2013.01); *F16K 1/2007* (2013.01); *F16K 1/2057* (2013.01); *F16K 31/041* (2013.01)

(58) Field of Classification Search
CPC ...... F16K 1/165; F16K 1/2007; F16K 1/2021; F16K 1/2057; F16K 1/2028; F16K 1/221; F16K 1/222; F16K 1/223; F16K 1/224; F16K 11/052; F16K 11/165; F16K 11/168; F16K 31/041; Y10T 137/86509; F02D 9/1025; F02D 9/103; F02D 9/1045; F02D 9/109; F02D 9/1095
See application file for complete search history.

(56) References Cited

U.S. PATENT DOCUMENTS 4,131,142 A * 12/1978 Barr ..................... B67D 7/0478
141/302
6,192,931 B1 * 2/2001 Guetersloh ............. F16K 1/165
137/601.14
(Continued)

FOREIGN PATENT DOCUMENTS

DE         10207060 A1 *  8/2003  ............... F16D 3/52
DE     102016201503 A1 *  8/2017  ............... F02D 9/00

*Primary Examiner* — Hailey K. Do
(74) *Attorney, Agent, or Firm* — Lempia Summerfield Katz LLC

(57) ABSTRACT

An air control valve for a fuel cell vehicle includes: a valve housing having a first port and a second port; a first rotary shaft rotatably mounted in the valve housing and configured to be rotated by a driving source; a first valve member connected to the first rotary shaft and configured to selectively open or close the first port by rotating about the first rotary shaft; a second rotary shaft mounted in the valve housing so as to be rotatable relative to the first rotary shaft; a second valve member connected to the second rotary shaft and configured to selectively open or close the second port by rotating about the second rotary shaft; and a spring member connected, at one end thereof, to the first rotary shaft and connected, at the other end thereof, to the second rotary shaft, thereby improving stability and reliability.

6 Claims, 8 Drawing Sheets

(56) References Cited

U.S. PATENT DOCUMENTS

| | | | |
|---|---|---|---|
| 7,740,228 B2* | 6/2010 | Simpson | F16K 31/045 251/308 |
| 2010/0095930 A1* | 4/2010 | Wong | F02D 11/106 123/336 |
| 2017/0244117 A1* | 8/2017 | Park | F16K 1/22 |

* cited by examiner

AIR CONTROL VALVE FOR FUEL CELL VEHICLE

CROSS-REFERENCE TO RELATED APPLICATIONS

This application claims priority to and the benefit of Korean Patent Application No. 10-2020-0035721, filed on Mar. 24, 2020, the entire contents of which are incorporated herein by reference.

FIELD

The present disclosure relates to an air control valve for a fuel cell vehicle, and more particularly, to an air control valve for a fuel cell vehicle, which is capable of improving a sealing performance and preventing a deterioration of a fuel cell stack.

BACKGROUND

The statements in this section merely provide background information related to the present disclosure and may not constitute prior art.

A fuel cell system refers to a system that continuously produces electrical energy by means of a chemical reaction of continuously supplied fuel. Research and development are consistently performed on the fuel cell system as an alternative capable of solving global environmental issues.

Based on types of electrolytes used for the fuel cell system, the fuel cell system may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), a direct methanol fuel cell (DMFC), and the like. Based on operating temperatures, output ranges, and the like as well as types of used fuel, the fuel cell systems may be applied to various application fields related to mobile power, transportation, distributed power generation, and the like.

Among the fuel cells, the polymer electrolyte membrane fuel cell is applied to the field of a hydrogen vehicle (hydrogen fuel cell vehicle) being developed to substitute for an internal combustion engine.

The hydrogen vehicle includes a fuel cell stack that produces electricity through an oxidation-reduction reaction between hydrogen and oxygen $O_2$. The hydrogen vehicle is configured to travel as a motor is operated by electricity produced by the fuel cell stack.

In addition, the hydrogen vehicle is provided with an air control valve configured to control air to be introduced into the fuel cell stack and to control air discharged from the fuel cell stack.

A valve disc of the air control valve operates to open an air flow path while the vehicle operates, and the valve disc operates to close the air flow path when the vehicle does not operate.

We have discovered that when air is introduced into the fuel cell stack while the vehicle is not used over a long period of time (e.g., the vehicle is parked over a long period of time), there is a problem in that the fuel cell stack deteriorates, which causes a decrease in performance of the fuel cell stack.

SUMMARY

The present disclosure provides an air control valve for a fuel cell vehicle, which is capable of improving a sealing performance and inhibiting a deterioration of a fuel cell stack.

In particular, the present disclosure improves a sealing performance in a state in which a valve member closes a port.

In addition, the present disclosure improves stability and reliability.

In addition, the present disclosure is to simplify a structure and miniaturize a device.

In one form of the present disclosure, an air control valve for a fuel cell vehicle includes: a valve housing having a first port and a second port; a first rotary shaft rotatably mounted in the valve housing and configured to be rotated by a driving source; a first valve member connected to the first rotary shaft and configured to selectively open or close the first port by rotating about the first rotary shaft; a second rotary shaft mounted in the valve housing so as to be rotatable relative to the first rotary shaft; a second valve member connected to the second rotary shaft and configured to selectively open or close the second port by rotating about the second rotary shaft; and a spring member connected, at one end thereof, to the first rotary shaft and connected, at the other end thereof, to the second rotary shaft.

This is to improve a sealing performance of the air control valve for a fuel cell vehicle and prevent a deterioration of the fuel cell stack.

That is, when air is introduced into a fuel cell stack due to a deterioration in sealing performance of an air control valve while a fuel cell vehicle is not used over a long period of time, there is a problem in that the fuel cell stack deteriorates, which causes a decrease in performance of the fuel cell stack.

In the related art, first and second valve members, which are configured to open or close two ports provided in an air control valve (e.g., a first port through which air is discharged from the fuel cell stack and a second port through which air is supplied to a fuel cell stack), are coupled to a single rotary shaft and configured to be simultaneously rotated by a driving source that rotates the rotary shaft. As a result, there is a problem in that if the first valve member and the second valve member are misaligned (disposed in a non-horizontal manner) due to an assembly tolerance of each of the valve members or deformation (e.g., torsion) of the rotary shaft, a sealing performance implemented by the first and second valve members deteriorates.

In particular, in the structure in which the two valve members are coupled to the single rotary shaft configured to be rotated by the driving source, there is a problem in that the pressing force with which the second valve member disposed relatively far from the driving source (the second valve member which is disposed farther from the driving source than is the first valve member) closes the second port (the surface pressure with which the second valve member comes into contact with the second port) is lower than the pressing force with which the first valve member closes the first port (the surface pressure with which the first valve member comes into contact with the first port). Further, there is a problem in that it is difficult for the second valve member to completely close the second port when an angle at which the second valve member closes the second port is erroneously set or even when a slight assembly tolerance occurs.

However, according to the present disclosure, the first rotary shaft connected to the first valve member and the second rotary shaft connected to the second valve member are separated and rotatable relative to each other, and the first rotary shaft and the second rotary shaft are elastically connected by the spring member so as to be rotatable relative to each other. The rotating of only the first rotary shaft by the single driving source may sufficiently provide not only the pressing force that allows the first valve member to close the first port, but also the pressing force that allows the second valve member (which is farther from the driving source than is the first valve member) to close the second port. As a result, it is possible to obtain an advantageous effect of improving the sealing performance implemented by the first valve member and the second valve member and minimizing the introduction of air into the fuel cell stack when the fuel cell vehicle is not used.

The second rotary shaft may be mounted in the valve housing with various structures that allow the second rotary shaft to rotate independently of the first rotary shaft.

As an example, the second rotary shaft may be disposed at an end of the first rotary shaft in a longitudinal direction of the first rotary shaft and provided coaxially with the first rotary shaft.

Various springs, which may elastically connect the first rotary shaft and the second rotary shaft so that the first rotary shaft and the second rotary shaft may rotate relative to each other, may be used as the spring member, but the present disclosure is not restricted or limited by the type and the structure of the spring member.

As an example, a first flange portion having an enlarged diameter may be formed at the end of the first rotary shaft, and a second flange portion having an enlarged diameter may be formed at the end of the second rotary shaft facing the first flange portion. One end of the spring member may be connected to the first flange portion, and the other end of the spring member may be connected to the second flange portion.

As described above, since the spring member is disposed between the first flange portion and the second flange portion, it is possible to obtain an advantageous effect of preventing interference between the spring member and peripheral components and improving operational stability of the spring member.

According to the exemplary form of the present disclosure, when rotational force from the driving source is applied to the first rotary shaft in a state in which a rotation of the second rotary shaft is allowed, the second rotary shaft is rotated by the first rotary shaft by means of the spring member. Further, when rotational force from the driving source is applied to the first rotary shaft in a state in which a rotation of the second rotary shaft is restricted, the spring member is compressed, the first rotary shaft rotates relative to the second rotary shaft, and elastic rotational force generated by the compression of the spring member is applied to the second rotary shaft.

As described above, according to the exemplary form of the present disclosure, both the pressing force generated by the rotation of the second rotary shaft and the elastic rotational force generated by the spring member are applied to the second valve member which is disposed farther from the driving source than is the first valve member, such that a contact surface pressure with which the second valve member closes the second port may be sufficiently provided. As a result, it is possible to obtain an advantageous effect of improving the sealing performance implemented by the second valve member and minimizing the introduction of air into the fuel cell stack.

According to the exemplary form of the present disclosure, the air control valve for a fuel cell vehicle includes a valve seating part provided on the second port and having an inclined seating surface that allows the second valve member to be seated thereon, in which when the first rotary shaft is rotated by the driving source, the second valve member is seated on the inclined seating surface of the valve seating part first before the first valve member is seated on the seating surface of the first port. Further, the rotation of the second rotary shaft may be restricted when the second valve member is seated on the valve seating part.

A gradient of the inclined seating surface of the valve seating part may be variously changed in accordance with required conditions and design specifications. In particular, the gradient of the inclined seating surface may decrease in proportion to an increase in spring coefficient of the spring member.

In particular, according to the exemplary form of the present disclosure, in the state in which the first port and the second port are opened, the first valve member and the second valve member are disposed at an equal inclination angle with respect to the first rotary shaft.

As described above, the second port is provided with the valve seating part, and the first valve member and the second valve member are disposed at the equal inclination angle with respect to the first rotary shaft, such that when the first rotary shaft is rotated by the driving source, the second valve member may be quickly and stably seated on the inclined seating surface before the first valve member is seated on the seating surface.

According to the exemplary form of the present disclosure, an air discharge port of the fuel cell stack may be connected to the first port, and an air inlet port of the fuel cell stack may be connected to the second port.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
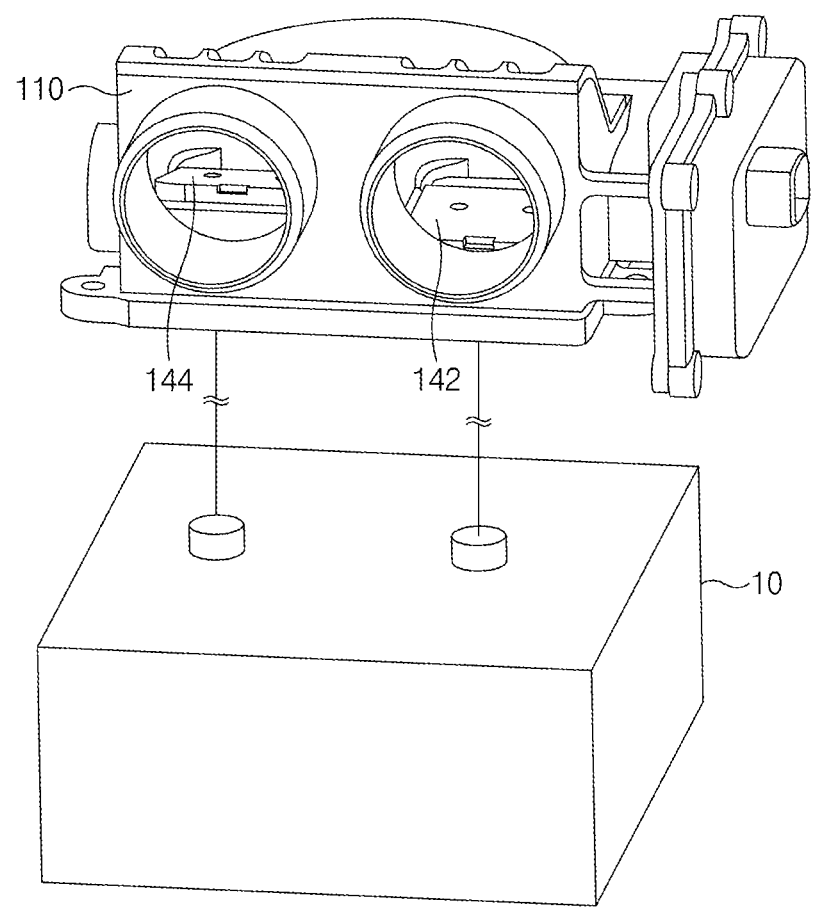
FIG. 1 is a view for explaining an air control valve for a fuel cell vehicle in one form of the present disclosure.
Figure 2:
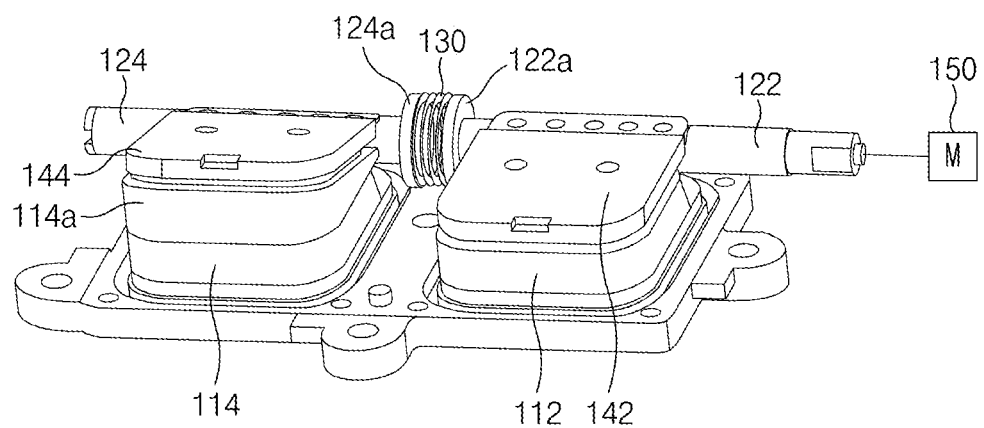
FIG. 2 is a view for explaining a connection structure between a first valve member and a second valve member of the air control valve for a fuel cell vehicle in one form of the present disclosure.
Figure 3:
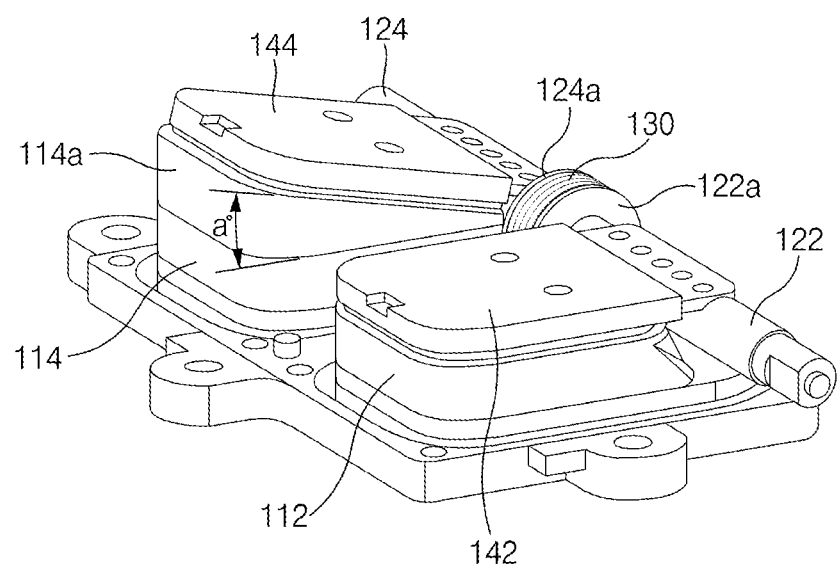
FIG. 3 is a view for explaining a valve seating part of the air control valve for a fuel cell vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings.

However, the technical spirit of the present disclosure is not limited to some exemplary forms described herein but may be implemented in various different forms. One or more of the constituent elements in the exemplary forms may be selectively combined, substituted, and used within the scope of the technical spirit of the present disclosure.

In addition, unless otherwise specifically and explicitly defined and stated, the terms (including technical and scientific terms) used in the exemplary forms of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

Unless particularly stated otherwise in the present disclosure, a singular form also includes a plural form. The explanation "at least one (or one or more) of A, B, and C" may include one or more of all combinations that can be made by combining A, B, and C.

In addition, the terms such as first, second, A, B, (a), and (b) may be used to describe constituent elements of the exemplary forms of the present disclosure.

These terms are used only for the purpose of discriminating one constituent element from another constituent element, and the nature, the sequences, or the orders of the constituent elements are not limited by the terms.

Further, the explanation "one constituent element is described as being 'connected', 'coupled', or 'attached' to another constituent element" may include not only a case in which one constituent element can be connected, coupled, or attached directly to another constituent element, but also a case in which one constituent element and another constituent element can be 'connected', 'coupled', or 'attached' by an additional constituent element intervening between one constituent element and another constituent element.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "up (above) or down (below)" may include a meaning of a downward direction as well as an upward direction based on one constituent element.

Referring to FIGS. 1 to 8, an air control valve 100 for a fuel cell vehicle in one form of the present disclosure includes: a valve housing 110 having a first port 112 and a second port 114; a first rotary shaft 122 rotatably mounted in the valve housing 110 and configured to be rotated by a driving source; a first valve member 142 connected to the first rotary shaft 122 and configured to selectively open or close the first port 112 by rotating about the first rotary shaft 122; a second rotary shaft 124 mounted in the valve housing 110 so as to be rotatable relative to the first rotary shaft 122; a second valve member 144 connected to the second rotary shaft 124 and configured to selectively open or close the second port 114 by rotating about the second rotary shaft 124; and a spring member 130 connected, at one end thereof, to the first rotary shaft 122 and connected, at the other end thereof, to the second rotary shaft 124.

For reference, the air control valve 100 may be used to control air to be introduced into a fuel cell stack 10 of a fuel cell vehicle and to control air discharged from the fuel cell stack 10.

The valve housing 110 has therein air flow paths (not illustrated) through which the air flows. The valve housing 110 is mounted in the vehicle (fuel cell vehicle).

The valve housing 110 may be variously changed in shape and structure in accordance with required conditions and design specifications, but the present disclosure is not restricted or limited by the shape and the structure of the valve housing 110.

More specifically, the air flow paths include a first air flow path (not illustrated) through which the air is discharged from the fuel cell stack 10, and a second air flow path (not illustrated) through which the air is supplied to the fuel cell stack 10. As an example, the first air flow path and the second air flow path may be individually separated in the valve housing 110.

In addition, the valve housing 110 is provided with the first port 112 connected to an air discharge port of the fuel cell stack 10, and the second port 114 connected to an air inlet port of the fuel cell stack 10.

Figure 7:
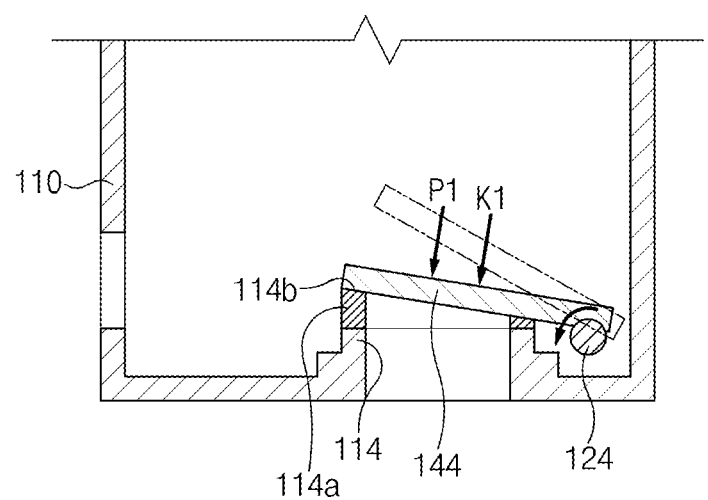
FIG. 7 is a view for explaining a state in which the second port is closed by the second valve member in the air control valve for a fuel cell vehicle in one form of the present disclosure.

As an example, referring to FIG. 7, the second port 114 may communicate with the second air flow path, and the air to be supplied to the fuel cell stack 10 may flow through the second port 114. In addition, referring to FIG. 8, the first port 112 may communicate with the first air flow path, and the air discharged from the fuel cell stack 10 may flow through the first port 112.

The first rotary shaft 122 is rotatably mounted in the valve housing 110 and provided to be selectively rotated by the driving source.

The driving source is connected to one end of the first rotary shaft 122 in order to rotate the first rotary shaft 122. A typical motor may be used as the driving source for rotating the first rotary shaft 122, but the present disclosure is not restricted or limited by types of driving sources or methods of operating the driving sources. According to another exemplary form of the present disclosure, other driving means such as a pneumatic cylinder or a hydraulic cylinder may be used as the driving source.

The first valve member 142 is connected integrally to the first rotary shaft 122 and provided to selectively open or close the first port 112 by rotating about the first rotary shaft 122.

As an example, the first valve member 142 is formed to have a shape corresponding to a cross-sectional shape (e.g., a quadrangular cross-sectional shape) of the first port 112. In other form, the first valve member may be formed in a shape different from the cross-sectional shape of the first port, but the present disclosure is not restricted or limited by the shape and the structure of the first valve member.

As the first rotary shaft 122 is rotated by driving power from the driving source, the first valve member 142 moves from a first closed position at which the first port 112 is closed to a first opened position at which the first port 112 is opened.

Figure 4:
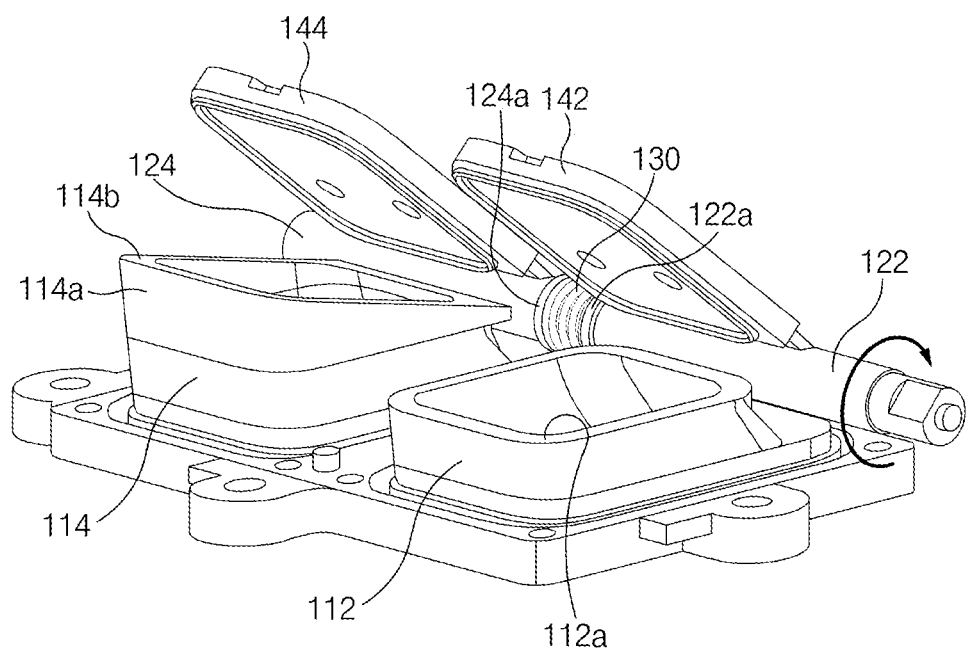
FIG. 4 is a view for explaining opened states of a first port and a second port of the air control valve for a fuel cell vehicle in one form of the present disclosure.

In this case, the configuration in which the first valve member 142 moves to the first closed position at which the first port 112 is closed means that the first valve member 142 is rotated to be seated on a seating surface 112a provided at an upper end of the first port 112 (based on FIG. 4). In addition, the configuration in which the first valve member 142 moves to the first opened position at which the first port 112 is opened means that the first valve member 142 is rotated to be spaced apart from the seating surface 112a provided at the upper end of the first port 112 (e.g., the first valve member 142 is inclined and spaced apart from the seating surface 112a).

The second rotary shaft 124 is mounted in the valve housing 110 so as to be rotatable independently of the first rotary shaft 122.

In this case, the configuration in which the second rotary shaft 124 rotates independently of the first rotary shaft 122 means that the relative rotation of the second rotary shaft 124 with respect to the first rotary shaft 122 is allowed.

As an example, the second rotary shaft 124 may be disposed at an end of the first rotary shaft 122 in a longitudinal direction of the first rotary shaft 122 and provided coaxially with the first rotary shaft 122. According to another exemplary form of the present disclosure, the second rotary shaft and the first rotary shaft may be disposed non-coaxially.

The second valve member 144 is connected integrally to the second rotary shaft 124 and provided to selectively open or close the second port 114 by rotating about the second rotary shaft 124.

As an example, the second valve member 144 is formed to have a shape corresponding to a cross-sectional shape (e.g., a quadrangular cross-sectional shape) of the second port 114. Alternatively, the second valve member may be formed in a shape different from the cross-sectional shape of the second port, but the present disclosure is not restricted or limited by the shape and the structure of the second valve member.

As the second rotary shaft 124 rotates, the second valve member 144 moves from a second closed position at which the second port 114 is closed to a second opened position at which the second port 114 is opened.

In this case, the configuration in which the second valve member 144 moves to the second closed position at which the second port 114 is closed means that the second valve member 144 is rotated to be seated on an inclined seating surface 114b provided at an upper end of the second port 114 (based on FIG. 4). In addition, the configuration in which the second valve member 144 moves to the second opened position at which the second port 114 is opened means that the second valve member 144 is rotated to be spaced apart from the inclined seating surface 114b provided at the upper end of the second port 114 (e.g., the second valve member 144 is inclined and spaced apart from the inclined seating surface 114b).

The spring member 130 is provided to elastically connect the first rotary shaft 122 and the second rotary shaft 124 so that the first rotary shaft 122 and the second rotary shaft 124 may rotate relative to each other.

More specifically, one end of the spring member 130 is connected to the first rotary shaft 122, and the other end of the spring member 130 is connected to the second rotary shaft 124.

Various springs (e.g., a coil spring or a torsion spring), which may elastically connect the first rotary shaft 122 and the second rotary shaft 124 so that the first rotary shaft 122 and the second rotary shaft 124 may rotate relative to each other, may be used as the spring member 130, but the present disclosure is not restricted or limited by the type and the structure of the spring member 130.

In particular, a first flange portion 122a having an enlarged diameter may be formed at the end of the first rotary shaft 122, and a second flange portion 124a having an enlarged diameter may be formed at the end of the second rotary shaft 124 facing the first flange portion 122a. The spring member 130 may be disposed between the first flange portion 122a and the second flange portion 124a so that one end of the spring member 130 is connected to the first flange portion 122a and the other end of the spring member 130 is connected to the second flange portion 124a.

As described above, since the spring member 130 is disposed between the first flange portion 122a and the second flange portion 124a, it is possible to obtain an advantageous effect of preventing interference between the spring member 130 and peripheral components and improving operational stability of the spring member 130.

According to another exemplary form of the present disclosure, as the structure similar to a scissors gear, it is possible to implement a structure (not illustrated) in which spring seating grooves are recessed or penetratively formed in first and second flange portions disposed to be in close contact with each other and the spring member is received in the spring seating grooves in a state in which the first and second flange portions are connected to each other.

In the exemplary form of the present disclosure described and illustrated in the drawings, the first rotary shaft 122 and the second rotary shaft 124 are connected to each other by means of the single spring member 130, but the number of spring members and the structure in which the spring members are arranged may be variously changed in accordance with required conditions and design specifications.

According to the exemplary form of the present disclosure, when rotational force from the driving source is applied to the first rotary shaft 122 in a state in which the rotation of the second rotary shaft 124 is allowed, the second rotary shaft 124 is rotated (R1) by the first rotary shaft 122 by means of the spring member 130.

In contrast, when rotational force from the driving source is applied to the first rotary shaft 122 in a state in which the rotation of the second rotary shaft 124 is restricted, the spring member 130 is compressed as the first rotary shaft 122 is rotated (R2) relative to the second rotary shaft 124, such that elastic rotational force, which is made by the compression of the spring member 130, is applied to the second rotary shaft 124.

For reference, in the exemplary form of the present disclosure, a state in which the rotation of the second rotary shaft 124 is allowed may mean a state in which the first valve member 142 is disposed at the first opened position at which the first port 112 is opened and the second valve member 144 is disposed at the second opened position at which the second port 114 is opened, as illustrated in FIG. 4.

In addition, the configuration in which the second rotary shaft 124 is rotated by the first rotary shaft 122 by means of the spring member 130 means that when the first rotary shaft 122 rotates (R1), the second rotary shaft 124 connected to the spring member 130 rotates (R1) together with the first rotary shaft 122. In particular, when the second rotary shaft 124 is rotated by the first rotary shaft 122 by means of the spring member 130, the first rotary shaft 122 and the second rotary shaft 124 are connected with the spring member 130 in a non-compressed state in which the spring member 130 is almost not compressed.

Figure 5:
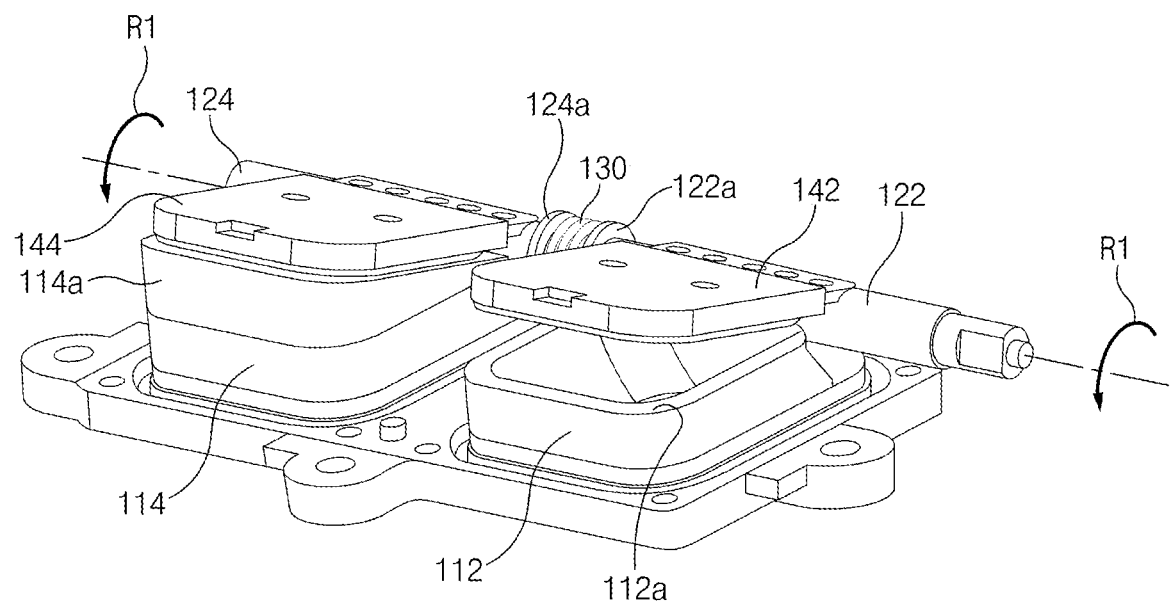
FIGS. 5 and 6 are views for explaining operational structures of the first valve member and the second valve member of the air control valve for a fuel cell vehicle in one form of the present disclosure.

Further, in the exemplary form of the present disclosure, the state in which the rotation of the second rotary shaft 124 is restricted means a state in which the counterclockwise rotation (based on FIG. 5) of the second rotary shaft 124 is restricted as the second valve member 144 is disposed at the second closed position at which the second port 114 is closed, as illustrated in FIG. 5.

Figure 6:
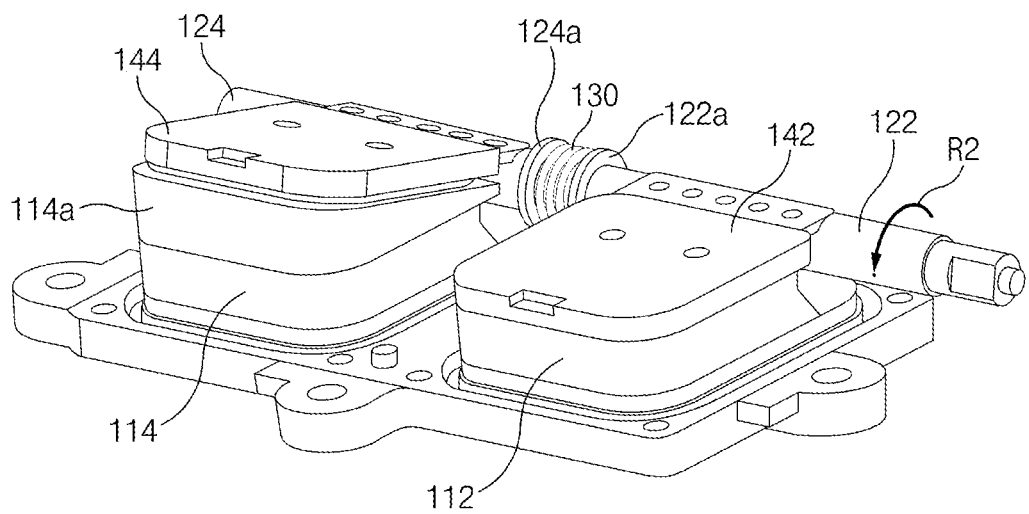
Figure 8:
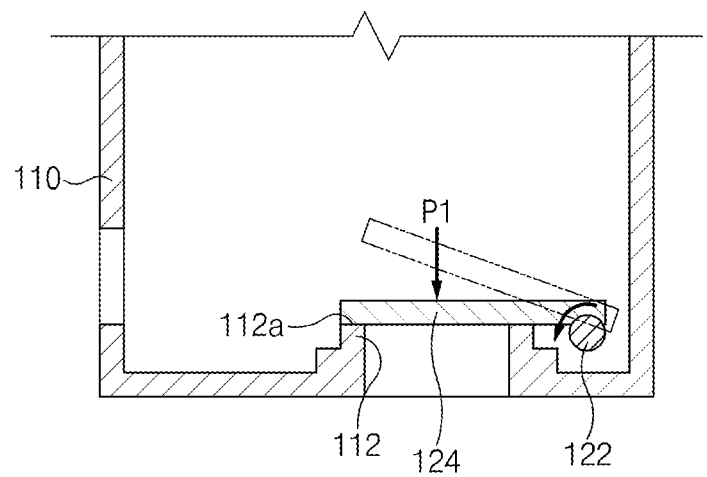
FIG. 8 is a view for explaining a state in which the first port is closed by the first valve member in the air control valve for a fuel cell vehicle in one form of the present disclosure.

Referring to FIGS. 6 and 8, when the rotational force from the driving source is still applied to the first rotary shaft 122 in the state in which the rotation of the second rotary shaft 124 is restricted, the spring member 130 is compressed, and the first rotary shaft 122 rotates (R2) relative to the second rotary shaft 124, such that the first valve member 142 may be disposed at the first closed position at which the first port 112 is closed. In this case, the state in which the first valve member 142 closes the first port 112 may be maintained by pressing force P1 which is generated by the rotation of the first rotary shaft 122 and applied to the first valve member 142.

Referring to FIG. 7, elastic rotational force, which is generated by the compression of the spring member 130, may be applied to the second rotary shaft 124 while the first valve member 142 moves to the first closed position. The state in which the second valve member 144 closes the second port 114 may be stably maintained as both the pressing force P1 generated by the rotation of the second rotary shaft 124 and the elastic rotational force K1 made by the spring member 130 are applied to the second valve member 144.

As described above, according to the exemplary form of the present disclosure, the first rotary shaft 122 connected to the first valve member 142 and the second rotary shaft 124 connected to the second valve member 144 are separated to be rotatable relative to each other, and the first rotary shaft 122 and the second rotary shaft 124 are elastically connected by means of the spring member 130 so as to be rotatable relative to each other. The rotation of the first rotary shaft 122 by the single driving source may sufficiently provide not only the pressing force that allows the first valve member 142 to close the first port 112, but also the pressing force that allows the second valve member 144 (which is farther from the driving source than is the first valve member) to close the second port 114. As a result, it is possible to obtain an advantageous effect of improving the sealing performance implemented by the first valve member 142 and the second valve member 144 and minimizing the introduction of air into the fuel cell stack 10 when the fuel cell vehicle is not used.

Above all, according to the exemplary forms of the present disclosure, both the pressing force P1 made by the rotation of the second rotary shaft 124 and the elastic rotational force K1 made by the spring member 130 are applied to the second valve member 144 which is disposed farther from the driving source than is the first valve member 142, such that a contact surface pressure with which the second valve member 144 closes the second port 114 may be sufficiently provided. As a result, it is possible to obtain an advantageous effect of improving the sealing performance implemented by the second valve member 144 and reducing or minimizing the introduction of air into the fuel cell stack 10.

According to the exemplary form of the present disclosure, the air control valve 100 for a fuel cell vehicle may include a valve seating part 114a provided on the second port 114 and having the inclined seating surface 114b on which the second valve member 144 is seated.

The valve seating part 114a has the inclined seating surface 114b that has a greater height (height in an up-down direction based on FIG. 7) than the seating surface 112a of the first port 112.

As an example, the valve seating part 114a may be formed to have a right-angled triangular cross-sectional shape. An upper surface of the valve seating part 114a, which corresponds to a hypotenuse of the right-angled triangle, forms the inclined seating surface 114b.

As described above, the valve seating part 114a is formed at the upper side of the second port 114, such that when the first rotary shaft 122 is rotated by the driving source, the second valve member 144 may be seated on the inclined seating surface 114b of the valve seating part 114a first before the first valve member 142 is seated on the seating surface 112a of the first port 112. In addition, the rotation of the second rotary shaft 124 may be restricted as the second valve member 144 is seated on the valve seating part 114a.

A gradient ($\alpha$ in FIG. 3) of the inclined seating surface 114b of the valve seating part 114a may be variously changed in accordance with required conditions and design specifications. In particular, the gradient a of the inclined seating surface 114b may decrease in proportion to an increase in spring coefficient k of the spring member 130.

For example, the gradient a of the inclined seating surface 114b may be set to be smaller as the spring coefficient of the spring member 130 is higher. On the contrary, the gradient a of the inclined seating surface 114b may be set to be larger as the spring coefficient of the spring member 130 is lower.

In particular, according to the exemplary form of the present disclosure, in the state in which the first port 112 and the second port 114 are opened, the first valve member 142 and the second valve member 144 are disposed at an equal inclination angle with respect to the first rotary shaft 122.

As described above, the second port 114 is provided with the valve seating part 114a, and the first valve member 142 and the second valve member 144 are disposed at an equal inclination angle with respect to the first rotary shaft 122, such that when the first rotary shaft 122 is rotated by the driving source, the second valve member 144 may be quickly and stably seated on the inclined seating surface 114b before the first valve member 142 is seated on the seating surface 112a.

According to another exemplary form of the present disclosure, in the state in which the first port and the second port are opened, the first valve member and the second valve member may be disposed at different inclination angles with respect to the first rotary shaft.

While the exemplary forms have been described above, but the exemplary forms are just illustrative and not intended to limit the present disclosure. It can be appreciated that various modifications and alterations, which are not described above, may be made to the present exemplary form by those skilled in the art without departing from the intrinsic features of the present exemplary form. For example, the respective constituent elements specifically described in the exemplary forms may be modified and then carried out.

According to the present disclosure as described above, it is possible to obtain an advantageous effect of improving the sealing performance and inhibiting a deterioration of the fuel cell stack.

In particular, according to the present disclosure, it is possible to obtain an advantageous effect of improving the sealing performance by allowing the valve member to close the port with a sufficient contact pressure.

In addition, according to the present disclosure, it is possible to obtain an advantageous effect of improving stability and reliability.

In addition, according to the present disclosure, it is possible to obtain an advantageous effect of simplifying a structure and miniaturizing a device.

What is claimed is:

1. An air control valve for a fuel cell vehicle, the air control valve comprising:
    a valve housing having a first port and a second port;
    a first rotary shaft rotatably mounted in the valve housing and configured to be rotated by a driving source;
    a first valve member connected to the first rotary shaft and configured to selectively open or close the first port by rotating about the first rotary shaft;
    a second rotary shaft mounted in the valve housing and configured to rotate relative to the first rotary shaft;
    a second valve member connected to the second rotary shaft and configured to selectively open or close the second port by rotating about the second rotary shaft; and
    a spring member connected, at a first end thereof, to the first rotary shaft and connected, at a second end thereof, to the second rotary shaft,
    wherein when a rotational force from the driving source is applied to the first rotary shaft in a state in which a rotation of the second rotary shaft is allowed, the second rotary shaft is rotated by the first rotary shaft by the spring member,
    wherein when the rotational force from the driving source is applied to the first rotary shaft in a state in which a rotation of the second rotary shaft is restricted, the spring member is compressed, the first rotary shaft is configured to rotate relative to the second rotary shaft, and an elastic rotational force generated by the compression of the spring member is applied to the second rotary shaft, and
    wherein in a state in which the second valve member is disposed to close the second port, a pressing force generated by the rotation of the first rotary shaft is applied to the first valve member, and a pressing force generated by the rotation of the second rotary shaft is applied to the second valve member in a same direction as the elastic rotational force generated by the spring member is applied to the second valve member.

2. The air control valve of claim 1, wherein an air discharge port of a fuel cell stack is connected to the first port, and an air inlet port of the fuel cell stack is connected to the second port.

3. The air control valve of claim 1, wherein the second rotary shaft is disposed at an end of the first rotary shaft in a longitudinal direction of the first rotary shaft and provided coaxially with the first rotary shaft.

4. The air control valve of claim 3, comprising:
    a first flange portion formed at an end of the first rotary shaft; and
    a second flange portion formed at an end of the second rotary shaft facing the first flange portion,
    wherein the first end of the spring member is connected to the first flange portion and the second end of the spring member is connected to the second flange portion.

5. The air control valve of claim 1, comprising:
    a valve seating part provided on the second port and having an inclined seating surface that has a greater height than a seating surface of the first port and configured to allow the second valve member to be seated thereon,
    wherein when the first rotary shaft is rotated by the driving source, the second valve member is seated on the inclined seating surface first before the first valve member is seated on the seating surface, and
    wherein the rotation of the second rotary shaft is restricted when the second valve member is seated on the valve seating part.

6. The air control valve of claim 5, wherein the first valve member and the second valve member are disposed at an equal inclination angle with respect to the first rotary shaft in a state in which the first port and the second port are opened.

* * * * *